(12) United States Patent
DeLean

(10) Patent No.: US 6,301,025 B1
(45) Date of Patent: Oct. 9, 2001

(54) METHOD FOR PERFORMING A COLOR SPACE TRANSFORMATION

(75) Inventor: Bruno DeLean, Labege (FR)

(73) Assignee: MGI Software Corporation, Richmond Hill (CA)

( * ) Notice: Subject to any disclaimer, the term of this patent is extended or adjusted under 35 U.S.C. 154(b) by 0 days.

(21) Appl. No.: 08/267,140

(22) Filed: Jun. 24, 1994

(51) Int. Cl.$^7$ .................................................. G03F 3/08
(52) U.S. Cl. .................... 358/518; 358/523; 358/525; 358/501
(58) Field of Search .................. 358/518, 523, 358/525, 530, 501, 448, 443; 382/162, 167; 345/153, 154

(56) References Cited

U.S. PATENT DOCUMENTS

| | | | |
|---|---|---|---|
| 3,893,166 | 7/1975 | Pugsley | 358/80 |
| 4,275,413 | * 6/1981 | Sakamoto et al. | 358/525 |
| 4,328,515 | * 5/1982 | Wellendorf | 358/523 |
| 4,500,919 | 2/1985 | Schreiber | 358/78 |
| 4,717,954 | 1/1988 | Fujita et al. | 358/80 |
| 4,907,075 | 3/1990 | Braudaway | 358/75 |
| 4,929,978 | 5/1990 | Kanamori et al. | 355/38 |
| 5,185,661 | 2/1993 | Ng | 358/75 |
| 5,204,665 | 4/1993 | Bollman et al. | 340/703 |
| 5,212,546 | 5/1993 | Arazi et al. | 358/80 |
| 5,331,439 | 7/1994 | Bachar | 358/500 |
| 5,381,246 | 1/1995 | Suzuki et al. | 358/500 |

FOREIGN PATENT DOCUMENTS

| | | |
|---|---|---|
| 2016238 | 9/1979 | (GB) . |
| 1011972 | 2/1992 | (IL) . |
| 9406242 | 3/1994 | (WO) . |

* cited by examiner

*Primary Examiner*—Edward L. Coles, Sr.
*Assistant Examiner*—Thomas D. Lee
(74) *Attorney, Agent, or Firm*—Blakely, Sokoloff, Taylor & Zafman

(57) ABSTRACT

A method for transforming a first image defined by a first multi-dimensional color space (RGB) into second image defined by a second multi-dimensional color space (CMYK). The method computes the transformation using information derived from a previous transformation of said second image into said first image. The method then minimizes the error produced while transforming the second image back into the first image. As such, an image editing system can display on a video monitor an image that is defined in one multi-dimensional color space (RGB), print using a printer that prints images using a second multi-dimensional color space (CMYK) and edit an image using any multi-dimensional color space (either RGB or CMYK) that facilitates rapid and accurate image editing.

14 Claims, 3 Drawing Sheets

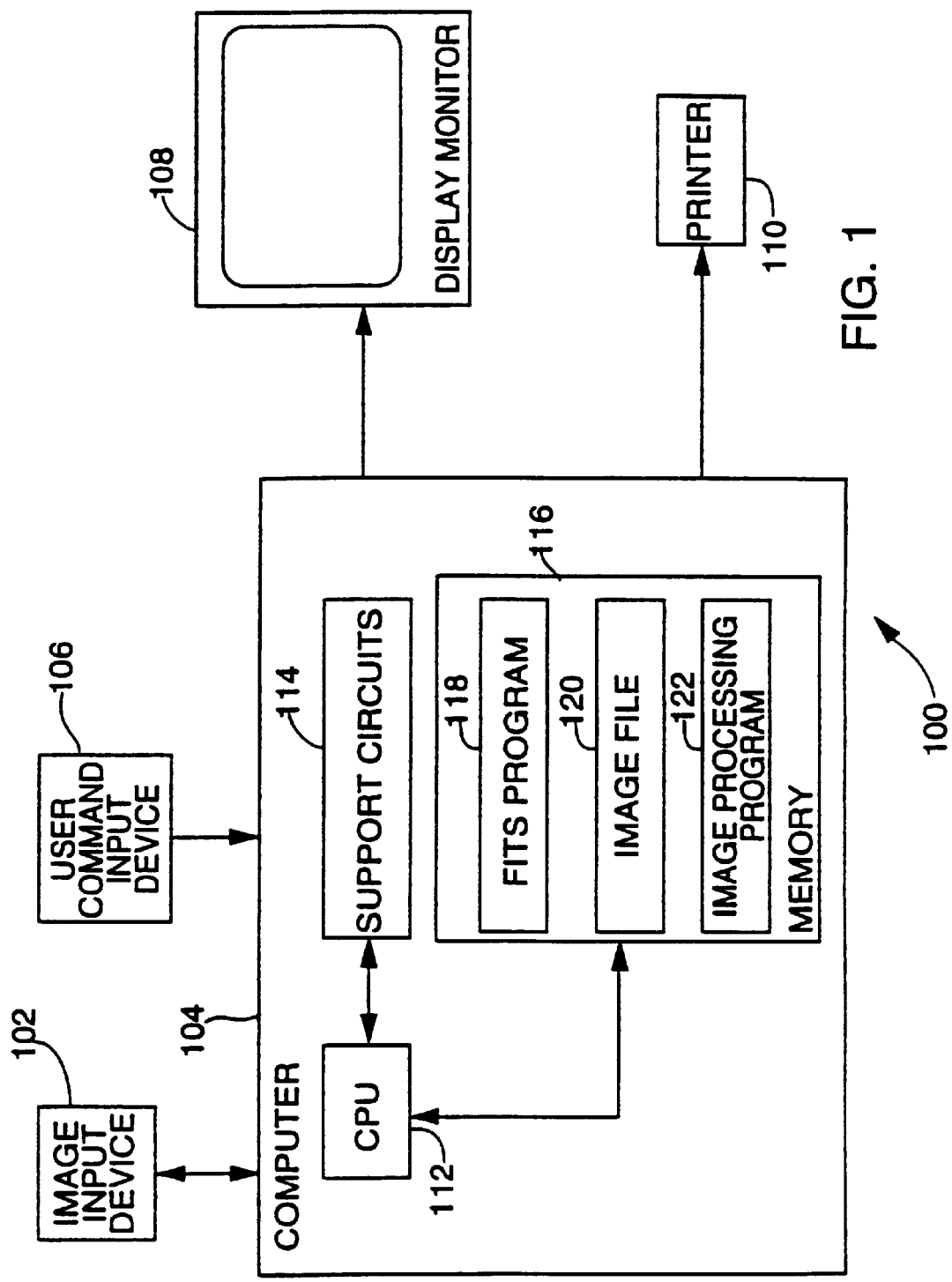

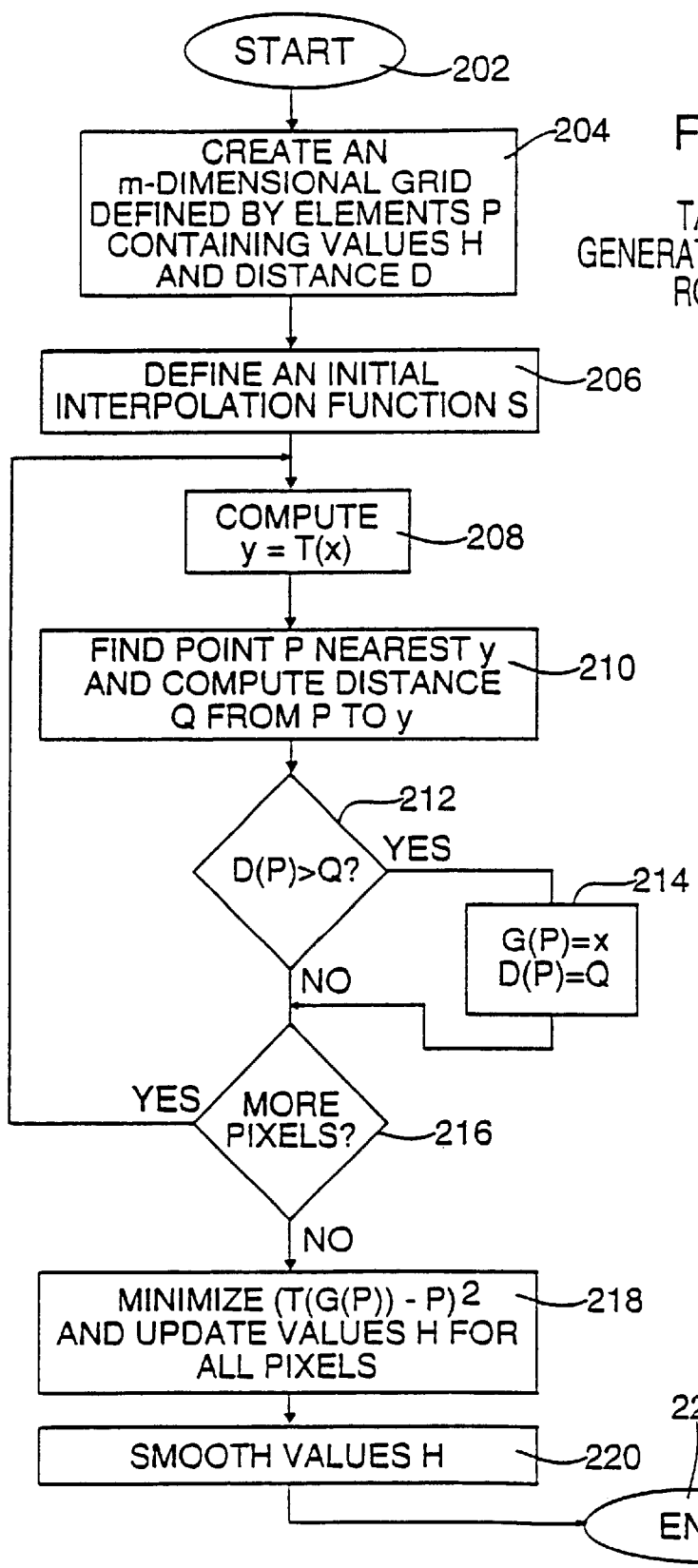

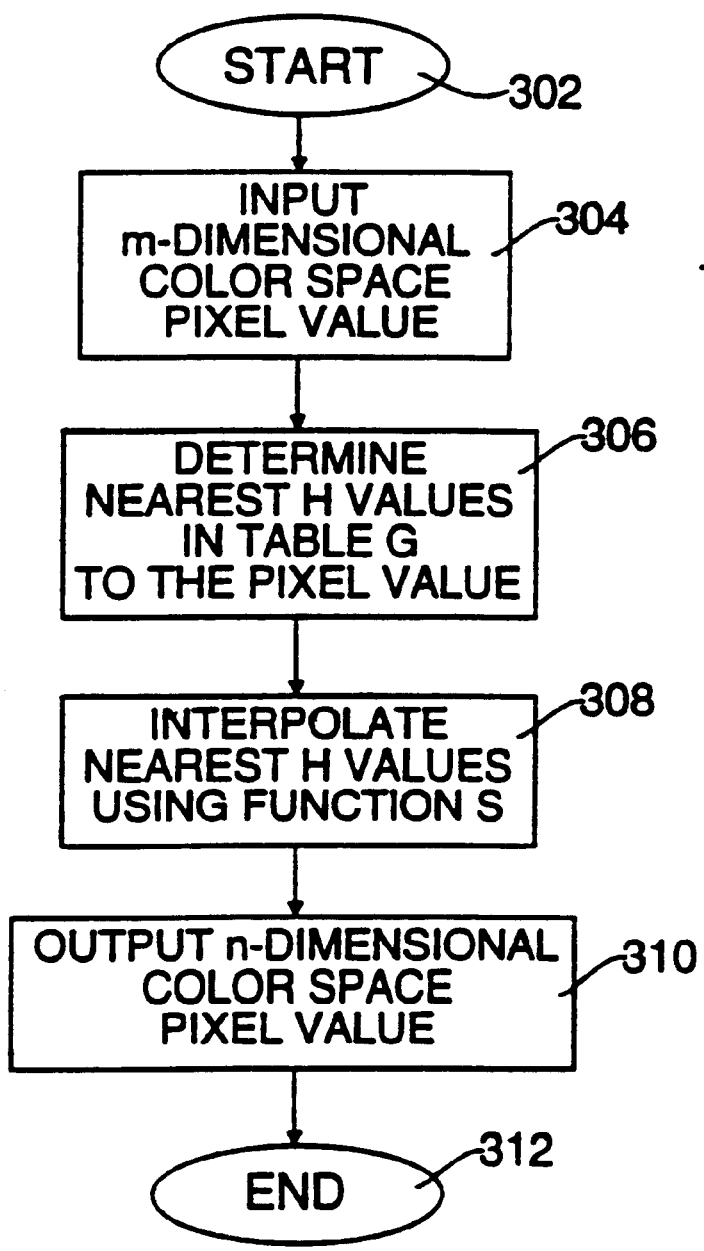

METHOD FOR PERFORMING A COLOR SPACE TRANSFORMATION

BACKGROUND OF THE DISCLOSURE

1. Field of the Invention

The invention relates to image processing systems. More particularly, the invention relates to a method for accurately transforming color information between two color spaces having differing dimensions, e.g., between a red-green-blue (RGB) color space and a cyan-magenta-yellow-black (CMYK) color space and vice versa.

2. Description of the Background Art

In printing, image retouching and image processing, it is often necessary to convert colors from one representation (color space) into another. Many computer video monitors and scanners, for example, use red-green-blue (RGB) representations for colors, while printers typically represent colors in terms of the amounts of a variety of differently colored inks (for example, cyan-magenta-yellow-black (CMYK)). As such, in a typical computer system, the RGB color space used to produce an image upon a computer screen must be converted into a CMYK color space to facilitate printing of the image depicted on the screen. However, for any particular two color spaces, it is in many instances much easier to convert in one direction than the other, e.g., convert from CMYK to RGB. For example, converting from CMYK to RGB is relatively easy because the CMYK space has more dimensions than the RGB space.

Specifically, an important task in photocompositing is to take a set of images in CMYK format, modify them, and output the result in CMYK. Many of the intermediate operations (image modifications) are more easily or effectively accomplished in RGB space, so it is often necessary to convert from CMYK to RGB and then back to CMYK. One problem with such a transformation is that a CMYK color space is a four-dimensional space and an RGB color space is a three-dimensional space, so the transformation from CMYK to RGB, though relatively simple, inherently loses color information. In particular, the color information produced by "black generation" during creation of the CMYK image is lost. Black generation describes an amount of black ink substituted for equal parts of Cyan, Magenta and Yellow for printing purposes. Consequently, it is very important that an image processing system be able to convert from CMYK to RGB and back to CMYK and produce a black component of the CMYK image that closely approximates the black component in the original CMYK image.

Thus, a difficult and widely needed color transformation is the transformation from an RGB color space to a CMYK color space that retains, as closely as possible, the black generation of the original CMYK image. U.S. Pat. No. 4,500,919 discloses a particular method for converting from RGB to CMYK which is called the Ink Correction Model (ICM). The patent mentions that the ICM ". . . could be implemented in one huge lookup table, but this would be uneconomic and would also give no clue as to how to find the data to be stored in the LUT short of an impossibly large printing test." [11:21] Since the time of filing of '919 patent, the cost of memory has been reduced sufficiently that it is no longer uneconomic to use "one huge lookup table". Furthermore, the '919 patent states that, in using a table based transformation, a large printing test must be conducted to facilitate color space transformation calibration. However, such printing tests are time consuming and complicate the transformation process.

Therefore, a need exists in the art for a method that rapidly and accurately transforms images from a first multi-dimensional color space, e.g., RGB, into a second multi-dimensional color space, e.g., CMYK, without using a printing test and which preserves as closely as possible the black generation of an original CMYK image.

SUMMARY OF THE INVENTION

The present invention overcomes the disadvantages heretofore associated with the prior art. Specifically, the present invention converts pixel values from one color space to another, e.g., RGB to CMYK, using a table of interpolated values. The values in the table are filled using data derived from sample images which have been previously converted in the other direction, e.g., CMYK to RGB. The invention infers from those sample images enough about the forward transformation to build an inverse transformation in the table.

In order to convert from RGB to CMYK while retaining as closely as possible the black generation of the original CMYK files, the present invention examines the CMYK files and implicitly infers a black generation model. It does this by creating a table in RGB space of the CMYK values found in the files. At the beginning, each sample of the RGB table is initialized with a value determined from a default transformation of RGB into CMYK using any default black generation strategy. The choice of this transformation is not very important because it is highly modified in the following steps performed by the invention. Next, each pixel of each CMYK image used for creation of the table is converted into RGB, and then the appropriate entries in the RGB-space table are modified so that the interpolation of the table entries at the RGB values yields a value as close as possible to the CMYK pixel color. Once the table has been constructed, it may be low-pass filtered (smoothed), so that the values are highly continuous and no visible artifacts can be identified in the conversion. If the CMYK values of the input images are converted to RGB and the resulting RGB values are converted back to CMYK using the table described above, the original CMYK values with their original black generation are reconstructed with high accuracy as long as all the input images used the same black-generation strategy. If several input images are used that were created with different black-generation strategies (different UCR, GCR, and the like), the table is constructed using an average of the different strategies.

A key advantage of the current invention is that the user need not know anything about the black-generation strategy used in the CMYK file. It is inferred automatically by the inventive method. In situations where people are collaborating over long distances and it is impractical to do a large series of printing tests to facilitate optimization of the color space transformation process, the invention has great advantages over the prior art.

BRIEF DESCRIPTION OF THE DRAWINGS

The teachings of the present invention can be readily understood by considering the following detailed description in conjunction with the accompanying drawings, in which:

FIG. 1 depicts a computer system capable of executing an image processing program as well as a color space transformation program in accordance this the present invention;

FIG. 2 depicts a flow chart of a color space transformation table generation routine as executed upon the computer system shown in FIG. 1; and FIG. 3 depicts a flow chart of a color space transformation routine that uses the table generated using the routine depicted in FIG. 2.

To facilitate understanding, identical reference numerals have been used, where possible, to designate identical elements that are common to the figures.

DETAILED DESCRIPTION

FIG. 1 is a block diagram of a conventional computer system 100 capable of executing a color space transformation computer program 118. This program contains a routine that implements the method of the present invention to transform an image based in a first color space into an image based in a second color space. As such, the images can then be respectively printed and displayed on a printer 110 and a display monitor 108 even though the printer and display monitor utilize differing types of color spaces to produce an image.

Specifically, the computer system 100 contains an image input device 102, a computer 104, a user input device 106, a display monitor 108 and a printer 110. In operation, an original image is created by an image input device 102 such as a conventional image scanner. The scanned image (also referred to herein as a source image or original image) is formatted by the scanner into an image file 120 using a particular color space (e.g., RGB or CMYK). The image is then stored in the memory 116 within computer 104. Alternatively, the original image could be generated by a drawing or drafting program (shown generally as image processing program 122) executed on the computer 104 or another computer and stored, as image file 120, in memory 116. The computer 104 contains at least one central processing unit (CPU) 112, memory 116, and various well-known CPU support circuits 114. An illustrative computer is a Macintosh Quadra model 900 manufactured by Apple Computer, Inc. of Cupertino, Calif. The transformation program 118 and the image editing program 122 as well as one or more images are stored in the memory 116.

In operation, a user typically manipulates the user command input device 106 such as a mouse, trackball, light pen, and/or keyboard, to control, via the computer 104, the image input device 102, e.g., an image scanner. The image scanner, in a conventional manner, scans a hardcopy of an image and stores a digitized representation of the hardcopy in the memory 116 as an image file 120. Subsequently, the user can instruct the CPU 112 to execute the image processing program 122 and also to recall an image file (original image) from the memory. The image processing program 122 interacts, as necessary, with the transformation program 118 to facilitate color space transformation and display of the image on the monitor 108 and the printer 110.

Broadly speaking, the transformation program 118 contains an executable routine that transforms a color space having n-dimensions to a color space having m-dimensions. In particular, consider a transformation T: $R^n \rightarrow R^m$ from an n-dimensional color space to a m-dimensional space and suppose that n>m. For example, $R^n$ may be a CMYK color space and $R^m$ may be an RGB color space. Since n has more dimensions than m, the mapping transformation T will generally be many-to-one. In other words, there are typically many different colors x in $R^n$ such that T(x)=y where y is a given color. In the general case, there will be an (n–m)-dimensional set of colors x such that T(x)=y for any given y.

Inverting T is problematic. Since T is many-to-one, there is no full inverse $T^{-1}$ such that $T^{-1}(T(x))=x$ for all x. Nonetheless, to perform accurate inverse color transformations in practical situations, it is important to be able to recover x as closely as possible from T(x).

The present invention makes use of the observation that even though $R^n$ is a higher-dimensional space than $R^m$, for many purposes, not all of $R^n$ is used to produce colors in an image. In fact, usually no more than an m-dimensional subspace of $R^n$ is used to produce a pixel color. Hence, for many purposes, it suffices to invert T(x) on an m-dimensional subspace.

The invention, which is embodied in a software routine 200 shown in FIG. 2, operates as follows:

The routine begins by creating an m-dimensional grid which samples $R^m$, an m-dimensional color space image. For example, if $R^m$ is in an RGB color space, then, at step 204, the routine creates, in memory, a table G. The table contains a grid that illustratively consist of 32×32×32 elements P. This grid is referred to as an interpolation table G. In each element P of table G, the routine places an n-dimensional value $H(i_1, i_2, \ldots i_m)=(h_1, h_2, \ldots h_n)$. These values of H are initialized using a default mapping from color space $R^m$ to color space $R^n$. For example, if $R^m$ is RGB and $R^n$ is CMYK, the default transformation can be given by a standard transformation with a particular UCR or GCR black generation strategy.

At step 206, the routine defines an interpolation function $S(x_1, x_2, \ldots x_m)=(s_1, s_2, \ldots s_n)$ based on the present elements H in the grid. For example, S can be the tri-linear interpolation of the entries H in G. With the interpolation defined, S is then a function from $R^m$ to $R^n$. The goal is to set the elements H in G such that the function S accurately inverts the given transformation function T(x).

In order to establish the values H, the routine looks for colors in $R^n$ that transform, according to the forward transformation T, to locations in $R^m$ near the samples in the interpolation table G. In order to achieve this goal, the routine stores with each element P, a distance D(P) to the nearest sample found thus far. If the method subsequently finds a closer sample, the routine updates G(P) and D(P). D(P) is initialized to the largest representable value at the beginning of the method.

Specifically, the source for the colors C is a source image containing a collection of pixels x in $R^n$ that ideally spans the range of colors of interest. For each x in C, the routine, at step 208, computes y=T(x). The routine, at step 210, then finds the point P in G which is closest to y. If, at step 212, a distance Q between y and P is less than D(P), the method, at step 214, sets G(P) to x and D(p) to Q. Through step 216, the routine repeats this operation for all the pixels in the source image. Preferably, the transformation function is applied to at least twenty-five pixel values.

If, at step 212, the distance D(P) of a point P in the grid G is not zero, then T(G(P)) is not exactly equal to P. In order to reduce or eliminate this error, the routine, at step 218, uses a second phase in which, for each point P in the grid G, the routine minimizes the squared error $(T(G(P))-p)^2$ by modifying value H. This produces a continuous minimization of the H values over m-variables and can be done using simple gradient descent, or a coarse-to-fine search technique. These techniques and other more sophisticated continuous minimization methods are well described in the literature (c.f. Practical Optimization, Gill et. al., Academic Press 1984).

It is possible that the table resulting from the second phase, i.e., an updated table G containing modified H values, can be insufficiently smooth if the colors in the source image do not cover the entire color space. Consequently, there will be a transition region between the portion of G(P) which still contains the original default mapping and the portion that contains the updated mapping based on the source image. To ensure that there are no objectionable artifacts produced by this boundary, the routine, at step 220, smoothes the values H in G in a third phase. Any low-pass filter may be used for this smoothing operation. For mappings from RGB to CMYK using a 32×32×32 table, averaging each CMYK sample H with its 9 neighbors produces acceptable results. The routine ends at step 224.

Using the grid G and the interpolation function S, any input pixel value from an m-dimensional color space is accurately transformed into a pixel value in an n-dimensional color space. FIG. 3 depicts a flow chart of a transformation routine 300 that performs such a dimensional transformation upon input pixel values.

The routine is entered at step 302 and proceeds to step 304. At step 304, an pixel value from an m-dimensional color space, e.g., RGB color space, is input. At step 306, the routine determines the H values in the table G that are nearest the input pixel value. The nearest H values are, at step 308, interpolated using the interpolation function S. At step 310, the routine outputs a a pixel value in n-dimensional color space, e.g., CMYK color space. Lastly, the routine ends at step 312.

In operation, the two routines (FIGS. 2 and 3) have obtained quite satisfactory results transforming colors from RGB to CMYK using the conventional tri-linear interpolant. The resulting transformation has the property for RGB to CMYK transformation that it reproduces very accurately the black generation in the original CMYK file. In experiments, the observed errors typically on the order of one or two percent of the original CMYK values.

Using the present invention within an image editing system, an operator can convert a series of images from CMYK to RGB, re-touch or edit the images in RGB, and then transform the result back into CMYK, knowing that the black-generation of the resulting CMYK image will very closely match the original black-generation.

Although one embodiment incorporating the teachings of the present invention has been shown and described in detail herein, those skilled in the art can readily devise many other varied embodiments that still incorporate these teachings.

I claim:

1. An interpolative method for transforming with dimensionality expansion from a set of selected working-image display-source three-tuples of numeric color values based in a three-dimensional display-source color space to a set of corresponding working-image printer-source four-tuples of numeric color values based in a four-dimensional printer-source color space, each working-image display-source three-tuple representing a particular visually-perceptible color as displayed on a color display screen, each such corresponding working-image printer-source four-tuple representing a color as printed by a color printer which appears visually to be substantially the same as the displayed color represented by the corresponding three-tuple, the interpolative dimensionality-expanding transformation at least approximately constituting an inverse of a prespecified dimensionality-contracting transformation $T^{(4 \to 3)}$ from the four-dimensional printer-source color space to the three-dimensional display-source color space as applied to a plurality of four-tuples of numeric color values from a set of exemplary color-print-image data based in the printer-source color space, the method comprising the steps of:

(a) generating an interpolation-parameter table comprising a set of interpolation-parameter-table index three-tuples representing points based in the three-dimensional display-source color space and a set of one-for-one corresponding interpolation-parameter-table parameter-entry four-tuples representing points based in the four-dimensional printer-source color space, each interpolation-parameter-table index three-tuple and corresponding interpolation-parameter-table parameter-entry four-tuple representing substantially the same color respectively as displayed on a display screen and as printed by a color printer, the step of a generating the interpolation-parameter table including the steps of:

(a.1) defining the set of interpolation-parameter-table index three-tuples to represent points of a three-dimensional grid of numeric-color-value three-tuples effectively spanning the three-dimensional display-source color space;

(a.2) generating a set of initial-trial-value numeric-color-value four-tuples for association respectively with corresponding interpolation-parameter-table index three-tuples, each interpolation-parameter-table index three-tuple and corresponding initial-trial-value numeric-color-value four-tuple at least roughly approximating the same color respectively as displayed on a display screen and as printed by a color printer;

(a.3) associating with each interpolation-parameter-table index three-tuple a corresponding refinement-process working-value four-tuple, the refinement-process working-value four-tuple being initialized to the corresponding initial-trial-value numeric-color-value four-tuple;

(a.4) associating with each interpolation-parameter-table index three-tuple a refinement-process closest-distance working parameter for encoding a distance in the three-dimensional display-source color space representative of a distance of closest approach of refinement-process transformed-color-print-image-data three-tuples during the course of a color-print-image-data refinement process, the refinement-process closest-distance working parameter for each interpolation-parameter-table index three-tuple being initialized to a value greater than zero; and (a.5) refining refinement-process working-value four-tuples to produce a set of interpolation-parameter-table parameter-entry four-tuples, the step of refining of refinement-process working-value four-tuples including the steps of:

(a.5.i) selecting each exemplary color-print-image four-tuple of numeric color values in the set of exemplary color-print-image data in turn as a refining-replacement-candidate four-tuple and applying the dimensionality-contracting transformation $T^{(4 \to 3)}$ to the refining-replacement-candidate four-tuple to obtain a corresponding refinement-process transformed-color-print-image-data three-tuple of numeric color values based in the three-dimensional display-source color space;

(a.5.ii) for each refinement-process transformed-color-print-image-data three-tuple, locating a closest interpolation-parameter-table-index three-tuple, the closest interpolation-parameter table index three-tuple being defined such that no other interpolation-parameter-table index three-tuple is closer in distance to the refinement-process transformed-color-print-image-data three-tuple; and (a.5.iii) for each refinement-process transformed-color-print-image-data three-tuple, computing a comparison-test distance encoding a distance in the three-dimensional display-source color space between the corresponding closest interpolation-parameter-table index three-tuple and the refinement-process transformed-color-print-image-data three-tuple and comparing the comparison-test distance to the current refinement-process closest-distance working parameter associated with the closest interpolation-parameter-table index three-tuple, and, in the event the comparison-test distance is less than the current refinement-process closest-distance working parameter, replacing the current refinement-process closest-distance working parameter with the comparison-test distance and replacing the associated refinement-process working-value four-tuple with the refining-replacement-candidate four-tuple from which the refinement-process transformed-color-print-image data three-tuple was obtained, so that after all of the exemplary color-print-image four-tuples in the set of exemplary color-print-image data have been selected, the refinement-process working-value four-tuples associated with the set of interpolation-parameter-table index three-tuples define a set of interpolation-parameter-table parameter-entry four-tuples;

(b) for each working image display-source three-tuple of numeric color values, computing a corresponding working-image printer-source four-tuple of numeric color values by an interpolation procedure, the interpolation procedure including the steps of:

(b.1) locating an interpolation-parameter indexing group of interpolation-parameter-table index three-tuples corresponding to the working-image display-source three-tuple, each interpolation-parameter-table index three-tuple of the interpolation-parameter indexing group being proximate to the working-image display-source three-tuple as measured in the three-dimensional display-source color space; and (b.2) calculating a corresponding working-image printer-source four-tuple by interpolating among the interpolation-parameter-table parameter-entry four-tuples of numeric color values corresponding to the interpolation-parameter-table index three-tuples of the interpolation-parameter indexing group in accordance with the relative distances between the respective interpolation-parameter-table index three-tuples and the working-image display-source three-tuple.

2. The method of claim 1 wherein the step (b.2) of calculating a corresponding working-image printer-source four-tuple by interpolating among interpolation-parameter-table parameter-entry four-tuples is accomplished by trilinear interpolation.

3. The method according to claim 1 in which the number of interpolation-parameter-table index three-tuples in the interpolation-parameter table is 32×32×32.

4. The method according to claim 1 in which the set of exemplary color-print-image data includes at least twenty-five exemplary color-print-image four-tuples.

5. The method according to claim 1 in which the three-dimensional display-source color space is an (RGB) color space and the four-dimensional printer-source color space is a (CMYK) color space.

6. An interpolative method for transforming with dimensionality expansion from a set of selected working-image display-source three-tuples of numeric color values based in a three-dimensional display-source color space to a set of corresponding working-image printer-source four-tuples of numeric color values based in a four-dimensional printer-source color space, each working-image display-source three-tuple representing a particular visually-perceptible color as displayed on a color display screen, each such corresponding working-image printer-source four-tuple representing a color as printed by a color printer which appears visually to be substantially the same as the displayed color represented by the corresponding three-tuple, the interpolative dimensionality-expanding transformation at least approximately constituting an inverse of a prespecified dimensionality-contracting transformation $T^{(4 \to 3)}$ from the four-dimensional printer-source color space to the three-dimensional display-source color space as applied to a plurality of four-tuples of numeric color values from a set of exemplary color-print-image data based in the printer-source color space, the method comprising the steps of:

(a) generating an interpolation-parameter table comprising a set of interpolation-parameter-table index three-tuples representing points based in the three-dimensional display-source color space and a set of one-for-one corresponding interpolation-parameter-table parameter-entry four-tuples representing points based in the four-dimensional printer-source color space, each interpolation-parameter-table index three-tuple and corresponding interpolation-parameter-table parameter-entry four-tuple representing substantially the same color respectively as displayed on a display screen and as printed by a color printer, the step of generating the interpolation-parameter table including the steps of:

(a.1) defining the set of interpolation-parameter-table index three-tuples to represent points of a three-dimensional grid of numeric-color-value three-tuples effectively spanning the three-dimensional display-source color space;

(a.2) generating a set of initial-trial-value numeric-color-value four-tuples for association respectively with corresponding interpolation-parameter-table index three-tuples, each interpolation-parameter-table index three-tuple and corresponding initial-trial-value numeric-color-value four-tuple at least roughly approximating the same color respectively as displayed on a display screen and as printed by a color printer;

(a.3) associating with each interpolation-parameter-table index three-tuple a corresponding refinement-process working-value four-tuple, the refinement-process working-value four-tuple being initialized to the corresponding initial-trial-value numeric-color-value four-tuple;

(a.4) associating with each interpolation-parameter-table index three-tuple a refinement-process closest-distance working parameter for encoding a distance in the three-dimensional display-source color space representative of a distance of closest approach of refinement-process, transformed-color-print-image-data three-tuples during the course of a color-print-image-data refinement process, the refinement-process closest-distance working parameter for each interpolation parameter-table index three-tuple being initialized to a value greater than zero; and (a.5) refining refinement-process working-value four-tuples to produce a set of optimization-starting-point numeric-color-value four-tuples, the step of refining of refinement-process working-value four-tuples including the steps of:

(a.5.i) selecting each exemplary color-print-image four-tuple of numeric color values in the set of exemplary color-print-image data in turn as a refining-replacement-candidate four-tuple and applying the dimensionality-contracting transformation $T^{(4\rightarrow3)}$ to the refining-replacement-candidate four-tuple to obtain a corresponding refinement-process transformed-color-print-image-data three-tuple of numeric color values based in the three-dimensional display-source color space;

(a.5.ii) for each refinement-process transformed-color-print-image-data three-tuple, locating a closest interpolation-parameter-table-index three-tuple, the closest interpolation-parameter table index three-tuple being defined such that no other interpolation-parameter-table index three-tuple is closer in distance to the refinement-process transformed-color-print-image-data three-tuple; and (a.5.iii) for each refinement-process transformed-color-print-image-data three-tuple, computing a comparison-test distance encoding a distance in the three-dimensional display-source color space between the corresponding closest interpolation-parameter-table index three-tuple and the refinement-process transformed-color-print-image-data three-tuple and comparing the comparison-test distance to the current refinement-process closest-distance working parameter associated with the closest interpolation-parameter-table index three-tuple, and, in the event the comparison-test distance is less than the current refinement-process closest-distance working parameter, replacing the current refinement-process closest-distance working parameter with the comparison-test distance and replacing the associated refinement-process working-value four-tuple with the refining-replacement-candidate four-tuple from which the refinement-process transformed-color-print-image-data three-tuple was obtained, so that after all of the exemplary color-print-image four-tuples in the set of exemplary color-print-image data have been selected, the refinement-process working-value four-tuples associated with the set of interpolation-parameter-table index three-tuples define a set of optimization-starting-point four-tuples;

(b) for each interpolation-parameter-table index three-tuple, adjusting numeric color values of the associated optimization-starting-point four-tuple to minimize effectively an error magnitude representative of a difference between the interpolation-parameter-table index three-tuple and a three-tuple resulting from applying the dimensionality-contracting transformation $T^{(4\rightarrow3)}$ to the adjusted numeric color values of the four-tuple associated with the interpolation-parameter-table index three-tuple to optimize effectively the relationship between the interpolation-parameter-table index three-tuple and the associated four-tuple with respect to the dimensionality-contracting transformation $T^{(4\rightarrow3)}$ starting from an optimization-starting-point four-tuple of numeric color values refined to take account of any sufficiently close four-tuple of numeric color values from the set of exemplary color-print-image data, thereby producing a set of effectively optimized interpolation-parameter-table parameter-entry four-tuples in respective association with the interpolation-parameter-table index three-tuples; and (c) for each working image display-source three-tuple of numeric color values, computing a corresponding working-image printer-source four-tuple of numeric color values by an interpolation procedure, the interpolation procedure including the steps of:

(c.1) locating an interpolation-parameter indexing group of interpolation-parameter-table index three-tuples corresponding to the working-image display-source three-tuple, each interpolation-parameter-table index three-tuple of the interpolation-parameter indexing group being proximate to the working-image display-source three-tuple as measured in the three-dimensional display-source color space; and (c.2) calculating a corresponding working-image printer-source four-tuple by interpolating among the interpolation-parameter-table parameter-entry four-tuples of numeric color values corresponding to the interpolation-parameter-table index three-tuples of the interpolation-parameter indexing group in accordance with the relative distances between the respective interpolation-parameter-table index three-tuples and the working-image display-source three-tuple.

7. The method of claim 6 further comprising smoothing the interpolation-parameter-table parameter-entry four-tuples.

8. The method of claim 7 wherein the smoothing is accomplished by low-pass filtering.

9. The method of claim 6 wherein the step (c.2) of calculating a corresponding working-image printer-source four-tuple by interpolating among interpolation-parameter-table parameter-entry four-tuples is accomplished by trilinear interpolation.

10. The method according to claim 6 in which the number of interpolation-parameter-table index three-tuples in the interpolation-parameter table is 32×32×32.

11. The method according to claim 6 in which the step (b) of adjusting numeric color values of an optimization-starting-point four tuple to minimize effectively an error magnitude is accompanied by a gradient descent procedure.

12. The method according to claim 6 in which the step (b) of adjusting numeric color values of an optimization-starting-point four-tuple to minimize an error magnitude is accomplished by a coarse-to-fine search procedure.

13. The method according to claim 6 in which the set of exemplary color-print-image data includes at least twenty-five exemplary color-print-image four-tuples.

14. The method according to claim 6 in which the three-dimensional display-source color space is an (RGB) color space and the four-dimensional printer-source color space is a (CMYK) color space.

* * * * *